W. V. TURNER.
BRAKE PIPE VENT VALVE DEVICE.
APPLICATION FILED MAY 11, 1908.
1,012,757.
Patented Dec. 26, 1911.
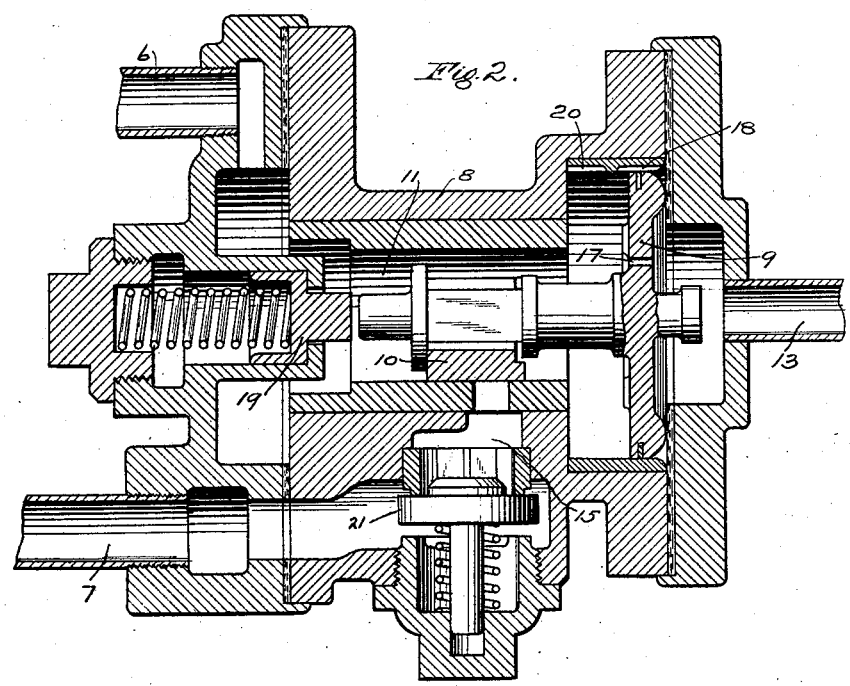
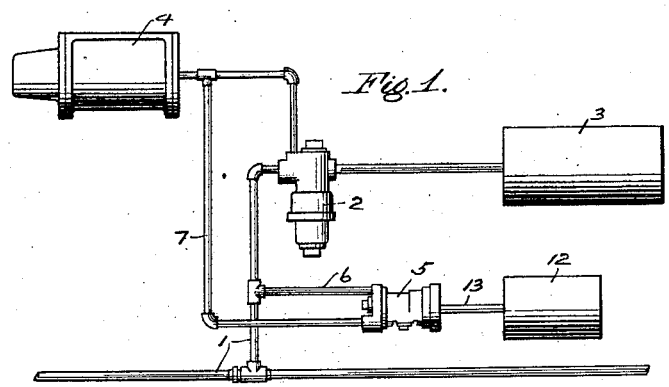

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

BRAKE-PIPE-VENT-VALVE DEVICE.

1,012,757.     Specification of Letters Patent.     Patented Dec. 26, 1911.

Application filed May 11, 1908. Serial No. 432,196.

*To all whom it may concern:*

Be it known that I, WALTER V. TURNER, a citizen of the United States, residing at Edgewood, in the county of Allegheny and State of Pennsylvania, have invented new and useful Improvements in Brake-Pipe-Vent-Valve Devices, of which the following is a specification.

This invention is in the nature of an improvement on the construction of brake pipe vent valve covered in my prior application, Serial No. 395,575, filed October 2, 1907.

The above prior construction comprises a valve and an actuating abutment therefor adapted upon a sudden reduction in brake pipe pressure to actuate the valve and open a vent port from the brake pipe to the brake cylinder. With this device applied to locomotive tenders, it sometimes happens in coupling the locomotive to a train of cars, that the brake-pipe pressure on the tender is suddenly reduced by flow of air to the train so that the vent valve device is operated and fluid from the brake pipe is vented to the brake cylinder. Should leakage occur from the brake cylinder a considerable waste of air may ensue before the fluid pressures have equalized on the piston of the vent valve device, so as to permit the parts to return and close the vent port.

It is, therefore, the main object of my present invention to provide means for quickly equalizing the fluid pressures on the vent valve piston after the actuation of same upon a reduction in brake-pipe pressure, so that the piston valve remains in open position only a short time, though sufficient to produce the desired venting of the brake pipe in ordinary operation.

In the accompanying drawing; Figure 1 is a diagrammatic view illustrating my improvements applied to a car air brake equipment, and Fig. 2 a central sectional view of the improved brake pipe vent valve device.

My invention may be applied to a car or tender air brake equipment such as illustrated in Fig. 1 of the drawing, comprising the usual automatic train brake pipe 1, connected to triple valve device 2, and an auxiliary reservoir 3, and brake cylinder 4. The brake pipe vent valve device 5 is connected to the brake pipe 1 by a pipe 6 and to the brake cylinder by a pipe 7.

As shown in Fig. 2 the vent valve device comprises a casing 8 containing a movable abutment 9 and slide valve 10 operated thereby. The brake pipe 1 is in communication with the valve chamber 11 through pipe 6, and the outer face of the piston 9 is open to the fluid under pressure in a small reservoir 12 which is connected thereto by a pipe 13. The brake cylinder 4 is connected to the vent valve device 5 by a pipe 7 which opens to a passage 15 in the casing 8 leading to the seat of the slide valve 10. When the brake pipe is charged with fluid under pressure, the air flows to the slide valve chamber and shifts the piston 9 to its outer position, the reservoir 12 being then charged to standard brake pipe pressure through an equalizing feed port 17 in the piston 9. As in the construction covered by my prior application hereinbefore mentioned, upon a sudden reduction in brake pipe pressure the piston 9 is shifted over so as to uncover the port 15. Air from the brake pipe is thereupon vented to the brake cylinder through the pipe 7. Possible tendency of the piston to move over in service applications is prevented by providing an equalizing groove 18 around the piston 9, which is closed when the piston is seated in the outer normal position, but which is opened at the first movement of the piston. Thus under service reductions in brake pipe pressure, should the piston start away from its seat, the fluid pressures on opposite sides of the piston rapidly equalize through the groove 18 in connection with the feed port 17, through the piston. A spring resistance device 19 is also provided, which is adapted to engage the piston on its preliminary movement and tends to prevent further movement thereof, a certain amount of lost motion being provided between the piston and slide valve 10, so that the valve is not shifted in this preliminary movement, to uncover the port 15. A check valve 21 is interposed in the brake cylinder passage 15, to prevent any back flow of air from the brake cylinder to the brake pipe.

According to my present improvement, I provide a second equalizing groove 20 adapted to establish communication from the valve chamber 11 and the brake pipe to the reservoir 12 on the opposite side of the piston when the piston is in its inner emergency position. By this means, upon actuation of piston 9 by a sudden reduction in brake pipe pressure, the parts assume their inner position, in which the groove 20 around the piston 9 is uncovered and the fluid pressures on opposite sides of the piston thereupon rapidly equalize and permit the spring device 19 to return the valve to close the brake pipe vent port. Any possibility of the piston remaining longer in the emergency position than necessary to secure the desired venting of the brake pipe is thus eliminated, and the return of the piston to a lap position is insured.

Having now described my invention, what I claim as new and desire to secure by Letters Patent, is:—

1. A brake pipe vent valve device comprising a valve for controlling communication from the brake pipe to the brake cylinder, a piston operated by a sudden reduction in brake pipe pressure for actuating said valve to open the brake pipe vent port and means for permitting the rapid equalization of pressures from one side of the piston to the other to thereby effect the quick return of the piston and valve to close said port.

2. A brake pipe vent valve device comprising a valve for controlling a brake pipe vent port to the brake cylinder, a piston subject to the opposing pressures of the brake pipe and a reservoir and operating upon a sudden reduction in brake pipe pressure to actuate the valve and open said vent port, said piston being also adapted to open an equalizing port to permit the rapid equalization of pressures on said piston.

3. A brake pipe vent valve comprising a valve for controlling a brake pipe vent port to the brake cylinder, a piston subject to the opposing pressures of the brake pipe and a reservoir and operating upon a sudden reduction in brake pipe pressure to actuate the valve and open said vent port, said piston being also adapted to open an equalizing port to permit the rapid equalization of pressures on said piston, and a spring device for returning said valve to close said vent port.

4. A brake pipe vent valve device comprising a valve for controlling a brake pipe vent port to the brake cylinder, a piston subject to the opposing pressures of the brake pipe and a reservoir and operating upon a sudden reduction in brake pipe pressure to shift said valve to a position opening said vent port and also opening an equalizing port around the piston to effect the rapid equalization of pressures on said piston, and a spring device for returning said valve to close the vent port.

In testimony whereof I have hereunto set my hand.

WALTER V. TURNER.

Witnesses:
R. F. EMERY,
EDITH B. MACDONALD.

---

Copies of this patent may be obtained for five cents each, by addressing the "Commissioner of Patents, Washington, D. C."